United States Patent
Kaneko et al.

(10) Patent No.: US 11,050,072 B2
(45) Date of Patent: Jun. 29, 2021

(54) FUEL CELL SYSTEM AND OPERATION CONTROL METHOD OF THE SAME

(71) Applicant: TOYOTA JIDOSHA KABUSHIKI KAISHA, Toyota (JP)

(72) Inventors: Tomohiko Kaneko, Toyota (JP); Yoshiaki Naganuma, Toyota (JP); Yutaka Tano, Toyota (JP); Yohei Okamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 292 days.

(21) Appl. No.: 14/940,764

(22) Filed: Nov. 13, 2015

(65) Prior Publication Data

US 2016/0141675 A1 May 19, 2016

(30) Foreign Application Priority Data

Nov. 14, 2014 (JP) .............................. JP2014-231822

(51) Int. Cl.
| | |
|---|---|
| *H01M 8/04* | (2016.01) |
| *H01M 8/20* | (2006.01) |
| *H01M 8/04858* | (2016.01) |
| *H01M 8/04537* | (2016.01) |
| *H01M 8/04302* | (2016.01) |
| *H01M 8/0444* | (2016.01) |

(52) U.S. Cl.
CPC ....... *H01M 8/0488* (2013.01); *H01M 8/0491* (2013.01); *H01M 8/04302* (2016.02);
(Continued)

(58) Field of Classification Search
CPC ........... H01M 8/0488; H01M 8/04559; H01M 8/04455; H01M 8/04302; H01M 8/04;
(Continued)

(56) References Cited

U.S. PATENT DOCUMENTS

| 2009/0169937 A1 | 7/2009 | Umayahara | |
|---|---|---|---|
| 2009/0284214 A1* | 11/2009 | Arthur | H01M 8/04298 320/101 |

(Continued)

FOREIGN PATENT DOCUMENTS

| DE | 112010001466 B4 | 3/2017 |
|---|---|---|
| DE | 112008003072 B4 | 8/2017 |

(Continued)

*Primary Examiner* — Cynthia H Kelly
*Assistant Examiner* — Aaron J Greso
(74) *Attorney, Agent, or Firm* — Finnegan, Henderson, Farabow, Garrett & Dunner, LLP

(57) ABSTRACT

The present invention provides a technique capable of satisfying both the restoration of an output voltage of a fuel cell and an improvement of electric power responsiveness in a fuel cell system in a situation in which its operation status is restored to a normal operation from an operation having low power generation efficiency.

A controller updates a lower limit voltage threshold in accordance with the restoration of an FC voltage until the operation status is restored to a normal operation from an operation having low power generation efficiency, such as an intermittent operation and a warmup operation (step S1). The controller increases an FC current in accordance with the updated lower limit voltage threshold (steps S2 and S3) to thereby satisfy both the requirements of the restoration of the output voltage of the fuel cell stack and the improvement of the electric power responsiveness.

3 Claims, 4 Drawing Sheets

(52) U.S. Cl.
CPC ... *H01M 8/04455* (2013.01); *H01M 8/04559* (2013.01); *H01M 2250/20* (2013.01); *Y02T 90/40* (2013.01)

(58) Field of Classification Search
CPC .......... H01M 2250/20; H01M 8/0491; H01M 8/0432; Y02T 90/32
See application file for complete search history.

(56) References Cited

U.S. PATENT DOCUMENTS

| | | | | |
|---|---|---|---|---|
| 2010/0047663 | A1* | 2/2010 | Manabe | H01M 8/04089 429/414 |
| 2010/0068576 | A1* | 3/2010 | Hamada | H01M 8/04559 429/411 |
| 2010/0261079 | A1* | 10/2010 | Kells | H01M 8/04037 429/429 |
| 2010/0266916 | A1 | 10/2010 | Imanishi et al. | |
| 2010/0291447 | A1 | 11/2010 | Imanishi et al. | |
| 2010/0291452 | A1* | 11/2010 | Imanishi | H01M 8/04223 429/432 |
| 2012/0007545 | A1 | 1/2012 | Yoshida et al. | |
| 2014/0205923 | A1 | 7/2014 | Matsumoto | |

FOREIGN PATENT DOCUMENTS

| | | |
|---|---|---|
| JP | 2008/052937 A | 3/2008 |
| JP | 2009-158398 A | 7/2009 |
| JP | 2010-244937 | 10/2010 |
| KR | 101151749 B1 | 6/2012 |

* cited by examiner

FUEL CELL SYSTEM AND OPERATION CONTROL METHOD OF THE SAME

CROSS-REFERENCES TO RELATED APPLICATIONS

This application relates to and claims priority from Japanese Patent Application No. 2014-231822, filed on Nov. 14, 2014, the entire disclosure of which is incorporated herein by reference.

BACKGROUND

Field of the Invention

The invention relates to an operation control method of a fuel cell system and particularly to an operation control method of a fuel cell system in a situation in which an operation status is restored from an intermittent operation or warm-up operation to a normal operation.

Description of Related Art

A fuel cell is a power generation system that directly converts energy released as a result of an oxidation reaction for oxidizing fuel through an electrochemical process into electric energy and such fuel cell has a stack structure in which a plurality of membrane-electrode assemblies (cells) is stacked, each membrane-electrode assembly including: an electrolyte membrane for selectively transporting hydrogen ions; and a pair of electrodes made of porous materials which sandwiches the electrolyte membrane on both surfaces thereof.

When a fuel cell system of this type is operated in a normal operation, the power generation of the fuel cell stack is controlled such that an operating point of the fuel cell stack moves on a current-voltage characteristics curve (a so-called I-V characteristics curve) La1 as shown in FIG. 4 in order to enhance the power generation efficiency of the fuel cell stack. On the other hand, when the fuel cell system is operated in an intermittent operation or in a warm-up operation, the power generation of the fuel cell stack is controlled such that the operating point of the fuel cell stack moves within areas deviating from the I-V characteristics curve La1 (see the intermittent operation area Aim and the warm-up operation area Awp). It should be noted that the warm-up operation refers to an operation intended to reduce the stoichiometric ratio of air during start-up at a low temperature (e.g. start-up at a below-freezing temperature) as compared to that seen in the normal operation, thereby purposely reducing the power generation efficiency and increasing the amount of heat generation of the fuel cell stack. The intermittent operation refers to an operation for temporarily stopping the supply of an oxidant gas and a fuel gas to the fuel cell stack during a low-load operation (e.g., during idling or during a vehicle's stuck in traffic jam).

As an example of a relevant technique, JP2010-244937 A discloses a control method in which, in order to secure an output response performance of a fuel cell stack during the restoration of an operation state from an operation having low power generation efficiency (intermittent operation) to an operation having high power generation efficiency (normal operation), a small amount of oxidant gas is continuously supplied during the intermittent operation and the operation status is switched to the normal operation at the time point when a required electric power exceeds a predetermined value. Such configuration can suppress a problem in which the output voltage of the fuel cell stack exceeds an open-circuit voltage during the intermittent operation of the fuel cell stack (in other words, a high-potential avoiding control is performed).

However, the above-described conventional technique has been found to have a problem in which, if the current is increased too much in response to a power generation request, the output voltage of the fuel cell stack becomes unable to be restored, whereas if the output current is not increased in order to wait for an increase in the output voltage of the fuel cell stack, the electric power responsiveness is lowered.

SUMMARY

The present invention has been made in light of the above circumstances and an object of the present invention is to provide a technique capable of satisfying both the restoration of the output voltage of a fuel cell and the improvement of electric power responsiveness in a fuel cell system in a situation in which its operation status is restored to a normal operation from an operation having low power generation efficiency, such as an intermittent operation or a warm-up operation.

In order to solve the problems described above, an aspect of the present invention provides a control method of a fuel cell system in a situation in which an operation status is restored to a normal operation from a low efficiency operation having lower power generation efficiency than that of the normal operation, the control method comprising a first step of increasing an output current of a fuel cell to a preset allowable current when a measured voltage of the fuel cell exceeds a lower it voltage of the fuel cell; and a second step of updating the lower limit voltage with the measured voltage after increasing the output current, wherein the first step and the second step are repeated until the measured voltage reaches a preset voltage limit.

In the above configuration, it may be preferable to further comprise a third step of decreasing the output current when the measured voltage does not exceed the lower limit voltage. It may be further preferable for the allowable current to be set based on an amount of oxidant gas to be supplied to the fuel cell and a stoichiometric ratio of air. The low efficiency operation in the above configuration may be an intermittent operation or a warmup operation Another aspect of the present invention provides a fuel cell system capable of switching an operation status between a normal operation and a low efficiency operation having lower power generation efficiency than that of the normal operation, the fuel cell system comprising: a current control part that increases an output current of the fuel cell to a preset allowable current when a measured voltage of the fuel cell exceeds a lower limit voltage of the fuel cell; a voltage update part that updates the lower limit voltage with the measured voltage after the output current is increased; and a control part that repeats an operation of increasing the output current by the current control part and an operation of updating the lower limit voltage with the measured voltage by the voltage update part until the measured voltage reaches a preset voltage limit.

DETAILED DESCRIPTION OF PREFERRED EMBODIMENTS

An embodiment of the present invention will be described below with reference to the attached drawings.

A. Present Embodiment

A-1. Configuration

Figure 1:
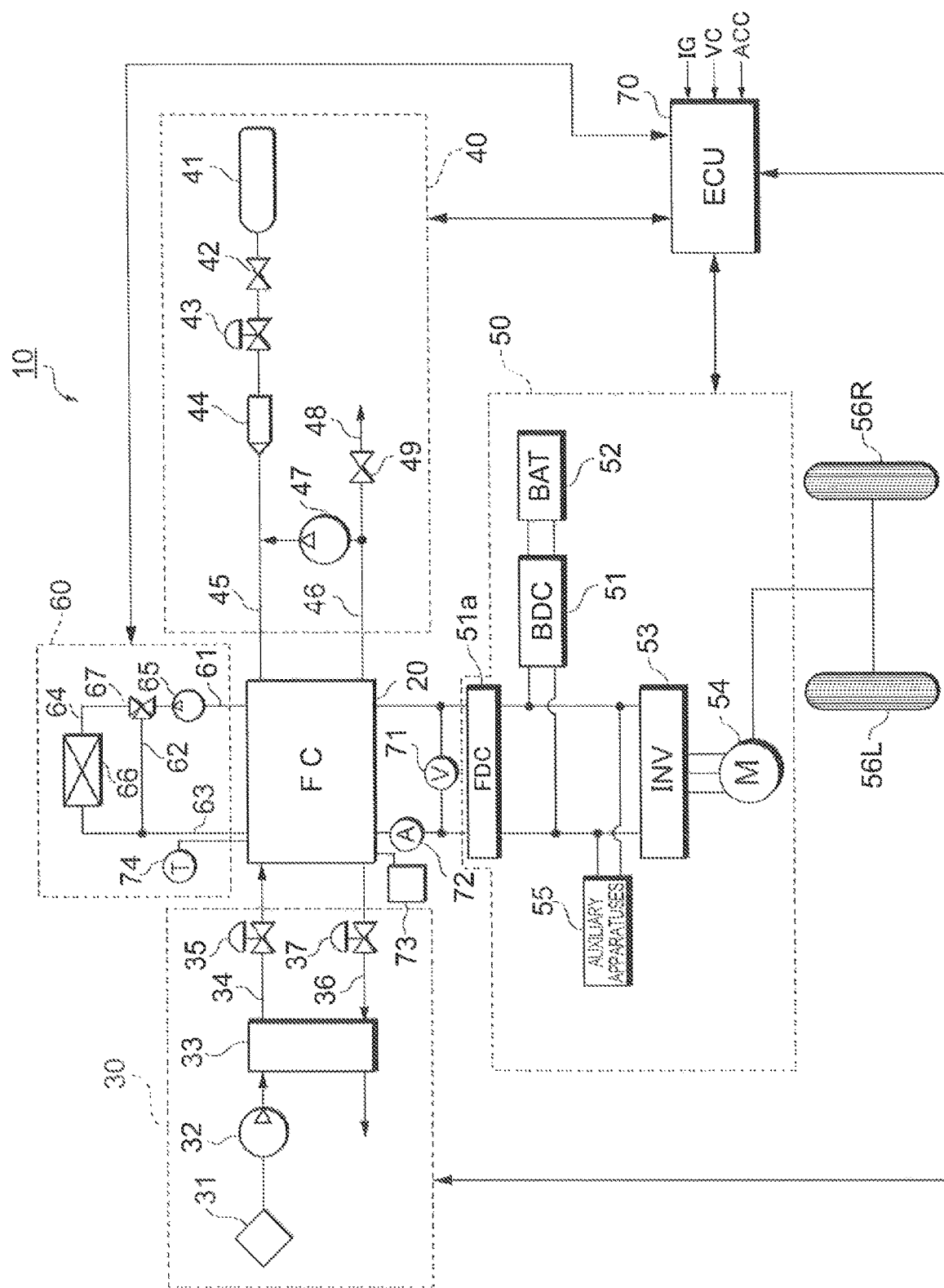
FIG. 1 is a diagram showing a general configuration of a fuel cell system according to an embodiment.

FIG. 1 shows a general configuration of a vehicle equipped with a fuel cell system 10 according to an embodiment. Although the following description assumes a fuel cell hybrid vehicle (FCHV) as one example of a vehicle, the fuel cell system may also be applied to various types of movable bodies (e.g., ships, airplanes and robots) other than vehicles and stationary power sources, as well as being applied to portable fuel cell systems.

A fuel cell system 10 is capable of switching an operation status between a normal operation and a low efficiency operation having lower power generation efficiency than that in the normal operation (to be described later in more detail) and the fuel cell system 10 functions as an in-vehicle power supply system that is to be installed in a fuel cell hybrid vehicle. The fuel cell system 10 includes a fuel cell stack 20 that generates electric power with supplied reactant gasses (a fuel gas and an oxidant gas), an oxidant gas supply system 30 for supplying the air as an oxidant gas to the fuel cell stack 20, a fuel gas supply system 40 for supplying hydrogen gas as a fuel gas to the fuel cell stack 20, an electric power system 50 for controlling charging and discharging of electric power, a cooling system 60 for cooling the fuel cell stack 20 and a controller (ECU) 70 for controlling the entire system.

The fuel cell stack 20 is a polymer electrolyte fuel cell stack in which a plurality of cells is stacked in series. In the fuel cell stack 20, an oxidation reaction represented by formula (1) below occurs at an anode electrode and a reduction reaction represented by formula (2) occurs at a cathode electrode. An electrogenic reaction represented by formula (3) occurs in the fuel cell stack 20 as a whole.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

A voltage sensor 71 for detecting an output voltage of the fuel cell stack 20, a current sensor 72 for detecting a power generation current and a cell voltage sensor 73 for detecting a cell voltage are attached to the fuel cell stack 20.

The oxidant gas supply system 30 includes: an oxidant gas passage 34 through which an oxidant gas supplied to the cathode electrode of the fuel cell stack 20 flows; and an oxidant off-gas passage 36 through which an oxidant off-gas discharged from the fuel cell stack 20 flows. The oxidant gas passage 34 is provided with an air compressor 32 for introducing an oxidant gas from the atmosphere via a filter 31, a humidifier 33 for humidifying the oxidant gas to be supplied to the cathode electrode of the fuel cell stack 20, and a throttle valve 35 for adjusting the supply of the oxidant gas. The oxidant off-gas passage 36 is provided with: a backpressure regulating valve 37 for regulating the supply pressure of the oxidant gas; and the humidifier 33 for exchanging moisture between the oxidant gas (dry gas) and the oxidant off-gas (wet gas).

The fuel gas supply system 40 includes: a fuel gas supply 41, a fuel gas passage 45 through which the fuel gas supplied from the fuel gas supply 41 to the anode electrode of the fuel cell stack 20 flows; a circulation passage 46 for circulating a fuel off-gas discharged from the fuel cell stack 20 so as to return to the fuel gas passage 45; a circulation pump 47 that pumps the fuel off-gas in the circulation passage 46 toward the fuel gas passage 45; and an exhaust/drain passage 48 that branches from the circulation passage 46.

The fuel gas supply 41 is constituted by, for example, a high-pressure hydrogen tank, a hydrogen absorbing alloy, etc., and stores a hydrogen gas at a high pressure (e.g., 35 MPa to 70 MPa). When opening a cutoff valve 42, the fuel gas flows from the fuel gas supply 41 toward the fuel gas passage 45. The pressure of the fuel gas is reduced to, for example, about 200 kPa by a regulator 43 and an injector 44, and then the fuel gas is supplied to the fuel cell stack 20

The fuel gas supply 41 may be constituted by: a reformer that generates a hydrogen-rich reformed gas from a hydrocarbon-based fuel; and a high pressure gas tank that accumulates the reformed gas which has been generated in the reformer after bringing it into a high-pressure state.

The regulator 43 is a device for regulating a pressure (primary pressure) on the upstream thereof into a preset secondary pressure and such regulator 43 is constituted by, for example, a mechanical pressure reducing valve for reducing the primary pressure. The mechanical pressure reducing valve has a casing in which a backpressure chamber and a pressure regulating chamber are formed with a diaphragm therebetween and has a configuration of reducing the primary pressure into a predetermined secondary pressure within the pressure regulating chamber by using the backpressure in the backpressure chamber.

The injector 44 is an electromagnetically-driven on-off valve capable of regulating a gas flow rate and a gas pressure by directly driving a valve body apart from a valve seat at predetermined intervals using an electromagnetic driving force. The injector 44 includes: the valve seat having an injection hole for injecting a gaseous fuel such as the fuel gas; a nozzle body that supplies and guides the gaseous fuel toward the injection hole; and the valve body that is movably accommodated and held in the nozzle body so as to be movable axially (in a direction of gas flow) relative to the nozzle body for opening and closing the injection hole.

The exhaust/drain passage 48 is provided with an exhaust/drain valve 49. The exhaust/drain valve 49 is actuated in response to a command from a controller 70 to discharge the fuel off-gas that contains impurities, as well as water, in the circulation passage 46 to the outside. By opening the exhaust/drain valve 49, the concentration of the impurities in the fuel off-gas in the circulation passage 46 is reduced so that the concentration of hydrogen in the fuel off-gas circulating in the circulation system can be increased.

The fuel off-gas discharged through the exhaust/drain valve 49 is mixed with the oxidant off-gas flowing in the oxidant off-gas passage 36 and diluted by a diluter (not shown). The circulation pump 47 is motor-driven so as to circulate the fuel off-gas in the circulation system and supply it to the fuel cell stack 20.

The electric power system 50 includes a fuel cell stack-dedicated converter (FDC) 51a, a battery-dedicated converter (BDC) 51b, a battery 52, a traction inverter 53, a traction motor 54 and auxiliary apparatuses 55. The FDC 51a functions to control an output voltage of the fuel cell stack 20 and the FDC 51a is a bidirectional voltage converter that converts (by increasing or decreasing) an output voltage that has been input to its primary side (input side: the side of the fuel cell stack 20) into a voltage value different from the primary side and outputs the resulting voltage to a secondary side (output side: the side of the inverter 53) or inversely converts the voltage that has been input to the secondary side into a voltage different from the secondary side and outputs the resulting voltage to the primary side. As a result of the voltage conversion control performed by the FDC 51a, the operating point (I, V) of the fuel cell stack 20 is controlled.

The BDC 51b functions to control an input voltage of the inverter 53 and has a circuit configuration that is, for example, similar to that of the FDC 51a. It should be noted that the above description is not intended to limit the circuit configuration of the BDC 51b, and the BDC 51b may employ any configuration that is capable of controlling the input voltage of the inverter 53.

The battery 52 functions as a storage source for excess electric power, as a storage source for regenerative energy to be used for regenerative braking, and as an energy buffer for load variations involved in acceleration or deceleration of a fuel cell hybrid vehicle. The battery 52 may preferably employ a secondary battery, such as a nickel-cadmium battery, a nickel-hydrogen battery and a lithium secondary battery.

The traction inverter 53 may be, for example, a PWM inverter driven by pulse width modulation, and the traction inverter 53 converts a direct-current voltage output from the fuel cell stack 20 or the battery 52 to a three-phase alternating current voltage in accordance with a control command provided by the controller 70 and controls a rotation torque of the traction motor 54. The traction motor 54 is a motor (e.g., a three-phase alternating current motor) for driving wheels 56L and 56R and constitutes a power source of the fuel cell hybrid vehicle.

The auxiliary apparatuses 55 collectively refer to motors provided in respective parts of the fuel cell system 10 (e.g., power sources for the pumps), inverters for driving these motors, various types of in-vehicle auxiliary apparatuses (e.g., an air compressor, injector, cooling-water circulation pump, radiator, etc.).

The cooling system 60 includes coolant passages 61, 62, 63, 64 in which a coolant circulating inside the fuel cell stack 20 flows, a circulation pump 65 for pumping the coolant, a radiator 66 for exchanging heat between the coolant and the outside air, a three-way valve 67 for switching between circulation paths of the coolant, and a temperature sensor 74 for detecting the temperature of the fuel cell stack 20. The three-way valve 67 is controlled so as to be opened or closed so that, when the normal operation starts after the completion of the warm-up operation, the coolant flowing out of the fuel cell stack 20 flows through the coolant passages 61, 64 so as to be cooled by the radiator 66, then flows through the coolant passage 63 and flows again into the fuel cell stack 20. On the other hand, at the time of the warm-up operation immediately after the start-up of the system, the three-way valve 67 is controlled so as to be opened or closed so that the coolant flowing out of the fuel cell stack 20 flows through the coolant passages 61, 62 63 and flows again into the fuel cell stack 20.

The controller 70 is a computer system which includes a CPU, an ROM an RAM, input/output interfaces and so on and the controller 70 functions as control means for controlling components (the oxidant gas supply system 30, fuel gas supply system 40, electric power system 50 and cooling system 60) of the fuel cell system 10. For example, when receiving a start signal 1G output from an ignition switch, the controller 70 starts the operation of the fuel cell system 10 and obtains required electric power for the entire system based on an accelerator pedal position signal ACC output from an acceleration sensor and a vehicle speed signal VC output from a vehicle speed sensor.

The required electric power for the entire system is the sum of the amount of electric power for the vehicle travel and the amount of electric power for the auxiliary apparatuses. The electric power for the auxiliary apparatuses includes electric power consumed by the in-vehicle auxiliary apparatuses (e.g. a humidifier, air compressor, hydrogen pump, cooling-water circulation pump, etc.), electric power consumed by apparatuses which are required for the vehicle travel (e.g. a transmission, wheel control apparatus, steering apparatus, suspension, etc.), electric power consumed by apparatuses provided inside a passenger compartment (e.g. an air conditioner, lighting equipment, audio system, etc.), and so on.

The controller 70 determines the distribution ratio of the electrical power output from the fuel cell stack 20 and the electric power output from the battery 52, computes a power generation command value and controls the oxidant gas supply system 30 and the fuel gas supply system 40 so that the amount of power generation of the fuel cell stack 20 fulfills the amount of required power generation $P_{req}$. The controller 70 also controls the FDC 51a, etc. to thereby control the operating point of the fuel cell stack 20. The controller 70 outputs an alternating-current voltage command value for each of a U-phase, V-phase and W-phase, as switching commands, to the traction inverter 53 so as to control the output torque and the number of revolutions of the traction motor 54, so that a target vehicle speed according to the accelerator pedal position can be obtained. In addition, in the present embodiment, when restoring the operation status to the normal operation from the warm-up operation or the intermittent operation (operations having lower power generation efficiency than that of normal operation, hereinafter referred to as "low efficiency operation" where appropriate in the context), the controller 70 sets a lower limit voltage threshold $V_{lol}$ for the fuel cell stack 20 and performs control so as not to increase the output current of the fuel cell stack 20 until the output voltage of the fuel cell stack 20 exceeds the lower limit voltage threshold $V_{lol}$ as a result of the supply of the oxidant gas (to be described later in more detail). The following description will describe an operation control process of the fuel cell stack 20 in a situation in which the operation status is restored from a low efficiency operation (which is assumed to be the intermittent operation in the following description) to the normal operation, which is one characteristic of the present embodiment.

A-2. Operation

<Operation Control Process During Restoration to Normal Operation>

Figure 2:
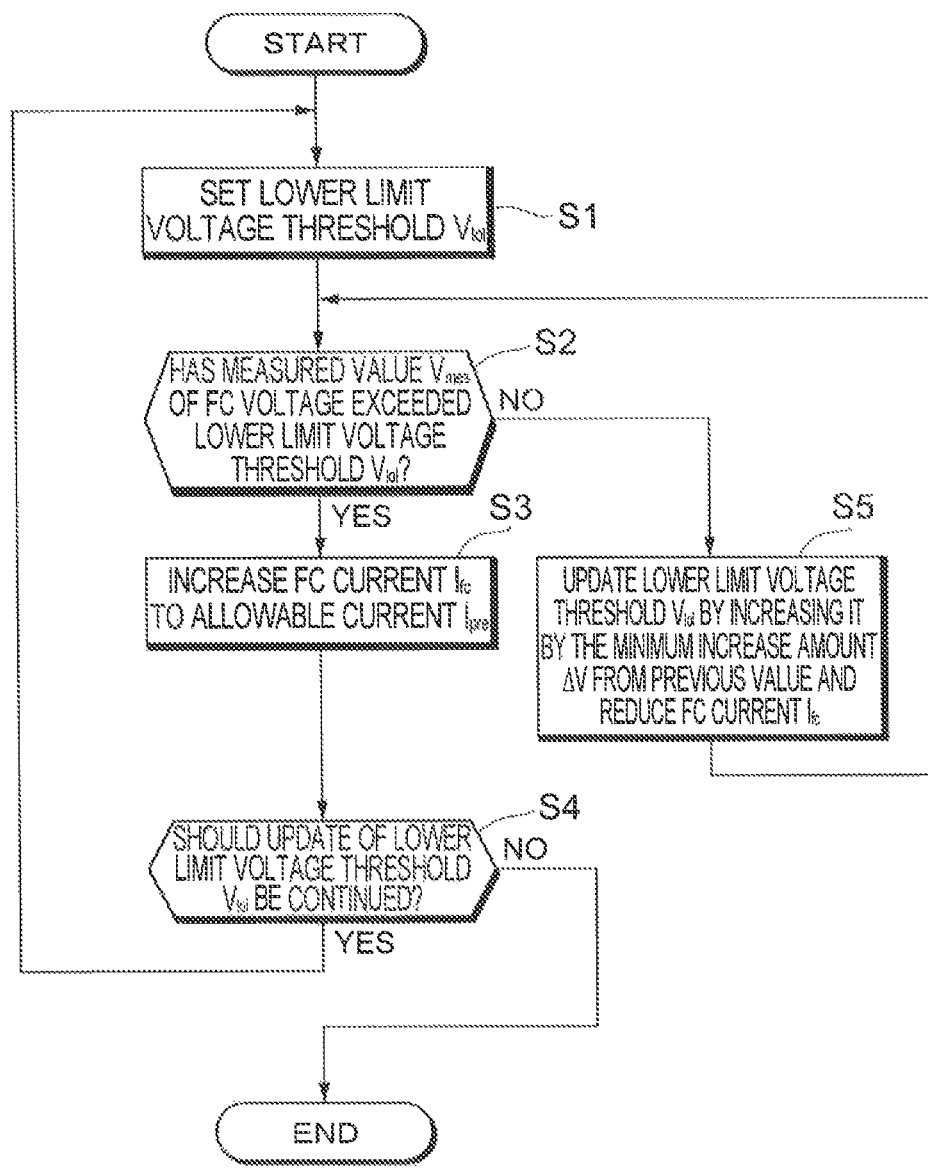
FIG. 2 is a flowchart showing an operation control process in a situation in which an operation status is restored from an intermittent operation to a normal operation.
Figure 3:
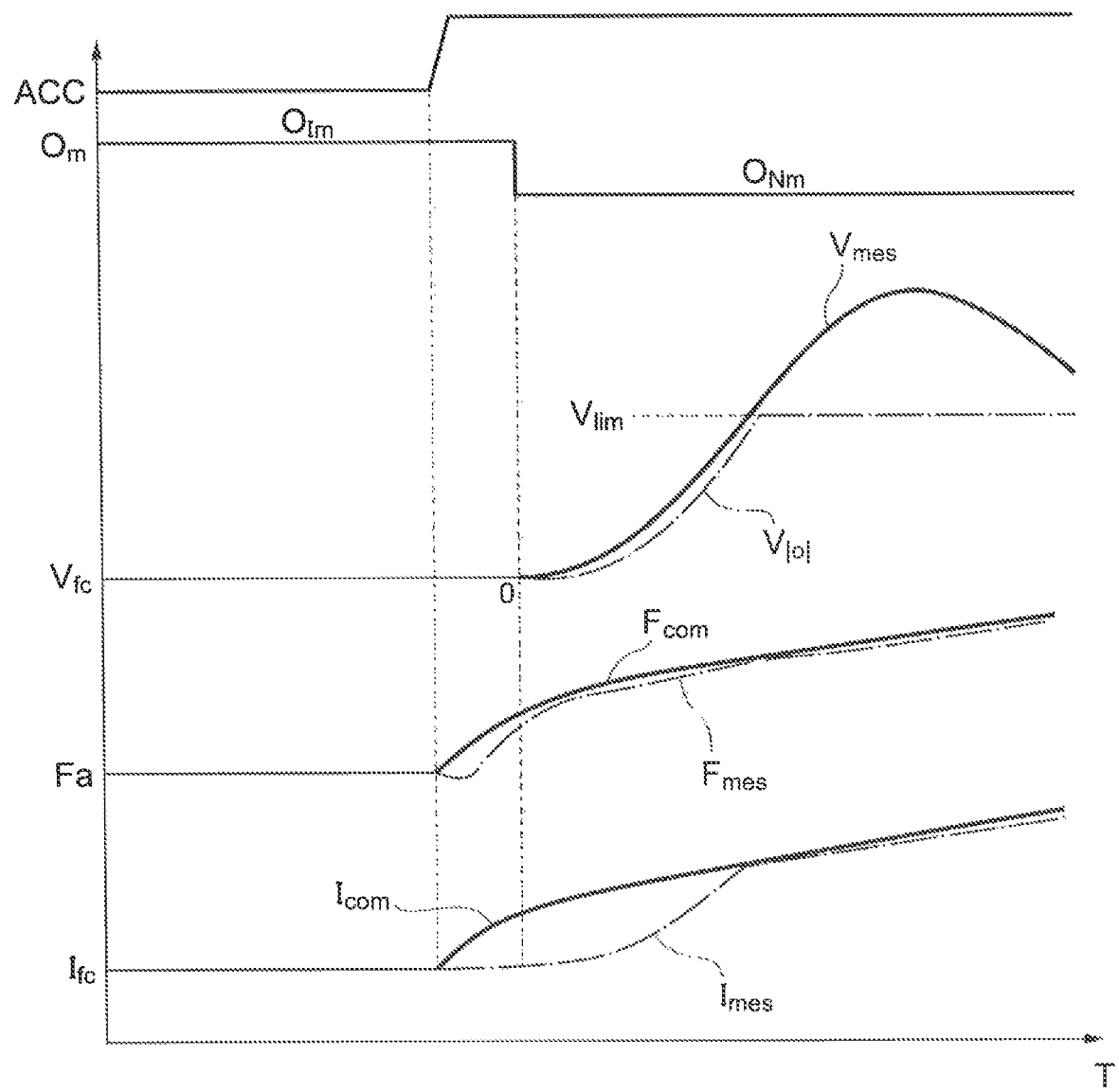
FIG. 3 is a timing chart showing a relationship among an accelerator pedal position signal ACC, an operation mode $O_m$, an FC voltage $V_{fc}$, an air flow rate $F_a$ and an FC current $I_{fc}$.
Figure 4:
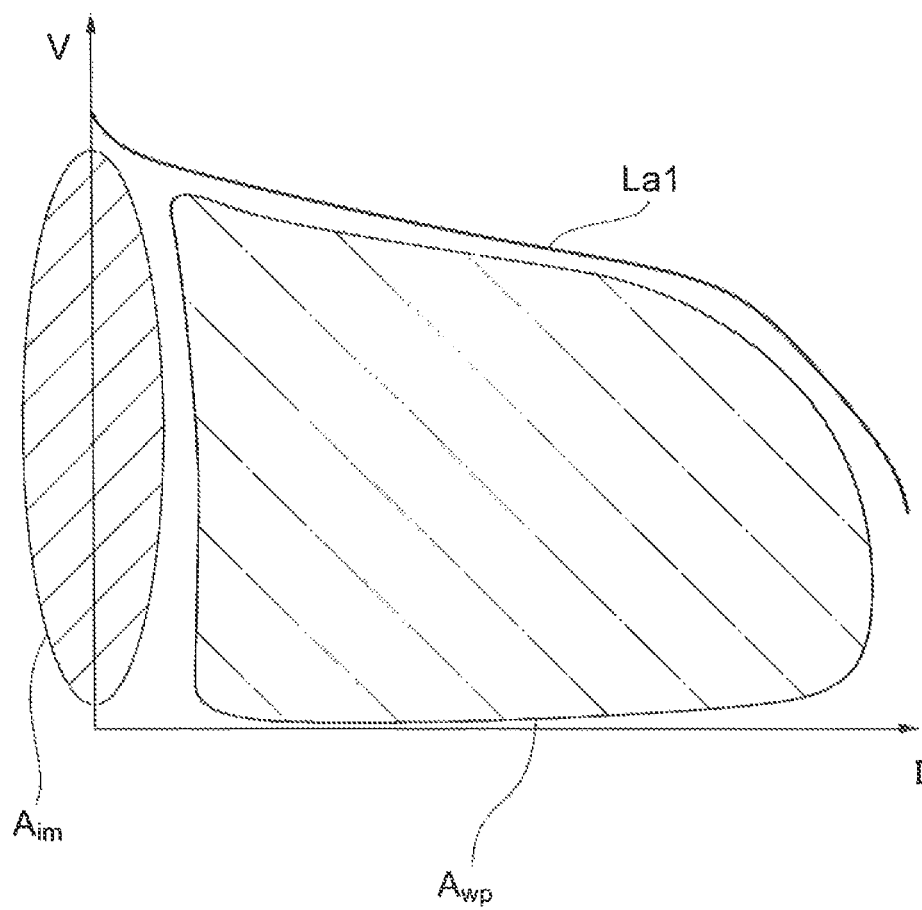
FIG. 4 is a conceptual diagram showing variations of an operating point in a conventional fuel cell system.

FIG. 2 is a flowchart showing an operation control process performed by the controller 70 for restoring an operation status from an intermittent operation to a normal operation and FIG. 3 is a timing chart showing a relationship among the accelerator pedal position signal ACC, the operation mode $O_m$, the output voltage $V_{fc}$ of the fuel cell stack 20 (FC voltage), the flow rate Fa of the oxidant gas to be supplied to the fuel cell stack 20 (air flow rate) and the output current $I_{fc}$ of the fuel cell stack 20 (FC current). Regarding the FC voltage $V_{fc}$, a measured value $V_{mes}$ thereof is shown by a thick solid line and the lower limit voltage threshold $V_{lol}$ thereof is shown by an alternating long and short dashed line. Regarding the air flow rate Fa, a command value $F_{com}$ thereof is shown by a thick solid line and a measured value $F_{mes}$ thereof is shown by an alternating long and short dashed line. Regarding the FC current $I_{fc}$, a command value $I_{com}$ thereof is shown by a thick solid line and a measured value $I_{mes}$ thereof is shown by an alternating long and short dashed line.

If the controller (control part) 70 judges that the operation status of the fuel cell stack 20 should be restored from the intermittent operation $O_{Im}$ to the normal operation $O_{Nm}$ based on the detection of a rapid change in the accelerator pedal position signal ACC, the controller 70 starts supply of the oxidant gas (air supply) and provides a command to the FDC 51a to increase the FC current $I_{fc}$ (see the command value $F_{com}$ and command value $I_{com}$ in FIG. 3). Then, the controller 70 sets a lower limit voltage threshold $V_{lol}$ for the fuel cell stack 20 (step S1). The initial value of the lower limit voltage threshold $V_{lol}$ may employ, for example, a measured voltage value $V_{mes}$ of the fuel cell stack 20 immediately before the FC voltage $V_{fc}$ starts to increase (in FIG. 3, the initial value of the lower limit voltage threshold $V_{lol}$ is "0"). An important point here is that, once the lower limit voltage threshold $V_{lol}$ for the fuel cell stack 20 is set, the output current $I_{fc}$ of the fuel cell stack 20 is not increased until the measured value $V_{mes}$ of the fuel cell stack 20 exceeds the lower limit voltage threshold $V_{lol}$ as a result of the air supply.

The process then proceeds to step S2, where the controller 70 judges whether the measured value $V_{mes}$ of the fuel cell stack 20 measured by the voltage sensor 71 has exceeded the lower limit voltage threshold $V_{lol}$ (step S2). If the controller (current control part) 70 judges that the measured value $V_{mes}$ of the fuel cell stack 20 has exceeded the lower limit voltage threshold $V_{lol}$ (step S2; YES), the controller 70 increases the FC current value $I_{fc}$ to an allowable current $I_{per}$ that is determined from the air flow rate Fa and a preset stoichiometric ratio of air, based on the amount of required power generation $P_{req}$ (step S3). As a result of such control, the measured value $I_{mes}$ of the FC current increases, following the increase of the lower limit voltage threshold $V_{lol}$ of the fuel cell stack 20. It should be noted that a time limit may be set for the judgment on whether or not the measured value $V_{mes}$ of the fuel cell stack 20 has exceeded the lower limit voltage threshold $V_{lol}$. Specifically, the judgment as to whether or not the measured value $V_{mes}$ of the fuel cell stack 20 has exceeded the lower limit voltage threshold $V_{lol}$ may be configured so as to be made within a predetermined time period from the time point when the lower limit voltage threshold $V_{lol}$ was set.

On the other hand, if the controller 70 judges that the measured value $V_{mes}$ of the fuel cell stack 20 has not exceeded the lower limit voltage threshold $V_{lol}$ in step S2 (step S2; NO), the controller 70 updates the lower limit voltage threshold $V_{lol}$ by increasing it by a minimum increase amount $\Delta V$ from its previous value and provides a command to the FDC 51a to decrease the FC current $I_{fc}$ (step S5). By decreasing the FC current $I_{fc}$ in this way, even when it is difficult to restore the FC voltage $V_{fc}$ due to, for example, deterioration of the fuel cell stack 20, the FC voltage $V_{fc}$ can still be increased (restored) in accordance with the increase of the air flow rate Fa. The process returns to step S2 where the controller 70 judges whether or not the measured value $V_{mes}$ of the fuel cell stack 20 has exceeded the lower limit voltage threshold $V_{lol}$. If the controller 70 judges that the measured value $V_{mes}$ of the fuel cell stack 20 has exceeded the lower limit voltage threshold $V_{lol}$ (step S2; YES), the controller increases the FC current $I_{fc}$ to the allowable current $I_{per}$ that is determined by the air flow rate Fa and the preset stoichiometric ratio of air based on the amount of required power generation $P_{req}$ (step S3). It should be noted that, instead of updating the lower limit voltage threshold $V_{lol}$ by increasing it by the minimum increase amount $\Delta V$ from its previous value in step S5, the previous value (or a value lower than the previous value) may alternatively be employed as-is as the lower limit voltage threshold $V_{lol}$ without setting the minimum increase amount $\Delta V$.

After increasing the FC current $I_{fc}$ in step S3, the controller 70 judges whether or not the update of the lower limit voltage threshold $V_{lol}$ should be continued (step S4). Specifically, the controller 70 judges whether the output voltage $V_{fc}$ of the fuel cell stack 20 has reached a voltage $V_{lim}$ to which the output voltage $V_{fc}$ should be restored even when the current was increased to the allowable current $I_{per}$ (hereinafter referred to as the "limit voltage $V_{lim}$") that is determined by the air flow rate Fa and the preset stoichiometric ratio of air (see FIG. 3). This limit voltage $V_{lim}$ and the above-mentioned minimum increase amount $\Delta V$ may be stored in a rewritable manner in, for example, a memory of the controller 70.

When the controller 70 judges that the Fc voltage $V_{fc}$ has not yet reached the limit voltage $V_{lim}$ and the update of the lower limit voltage threshold $V_{lol}$ should thus be continued (step S4; YES), the process returns to step S1 where the controller 70 sets (updates) a new lower limit voltage threshold $V_{lol}$. Specifically, the controller (voltage update part) 70 sets (updates) a current measured value $V_{mes}$ of the FC voltage $V_{fc}$ that is measured by the voltage sensor 71 as a new lower limit voltage threshold $V_{lol}$. Since the subsequent operations can be described in the same manner as the above-described operations, the description thereof will be omitted. On the other hand, if the controller 70 judges that the output voltage $V_{fc}$ of the fuel cell stack 20 has reached the limit voltage $V_{lim}$ and that the update of the lower limit voltage threshold $V_{lol}$ does not have to be continued (step S4; NO), the controller 70 terminates the above-described process.

As described above, according to the present embodiment, it is possible to satisfy both the requirements of the restoration of the output voltage of the fuel cell stack and the improvement of the electric power responsiveness by updating the lower limit voltage threshold in accordance with the restoration of the FC voltage and increasing the FC current in accordance with the updated lower limit voltage threshold during the restoration of the operation status from an operation having low power generation efficiency, such as the intermittent operation and the warm-up operation, to the normal operation. In addition, in the present embodiment, the FC current is controlled so as to be decreased when it is judged that the measured value of the fuel cell stack has not exceeded the lower limit voltage threshold. With such configuration, the restoration of the FC voltage can be promoted.

As described above, according to the present invention, in a situation in which the operation status is restored to the normal operation from the operation having low power generation efficiency, such as the intermittent operation and the warm-up operation, in a fuel cell system, it is possible to determine the operating point of the fuel cell so as to prioritize fulfillment of the amount of required power generation while avoiding various limitations, such as a current limit.

The present invention is suitably applicable to a fuel cell system in a situation in which its operation status is restored from an operation having low power generation efficiency to a normal operation.

What is claimed is:

1. A controller configured to perform a control method of a fuel cell system in a situation in which an operation status is restored to a normal operation from a low efficiency operation having lower power generation efficiency than that of the normal operation, the control method performed by the controller comprising:
    determining whether a measured voltage of a fuel cell stack of the fuel cell system exceeds a reference voltage of the fuel cell stack;
    increasing an output current of the fuel cell stack to a preset allowable current when the measured voltage of the fuel cell stack exceeds the reference voltage of the fuel cell stack, wherein the preset allowable current is determined from an amount of oxidant gas to be supplied to the fuel cell stack and a stoichiometric ratio of air, which is based on the amount of required power generation; and
    updating the reference voltage based on the measured voltage by increasing the reference voltage by a minimum increase amount ΔV from its previous value and decreasing the output current of the fuel cell stack when the measured voltage of the fuel cell stack does not exceed the reference voltage of the fuel cell stack, wherein updating the reference voltage and decreasing the output current are repeated until the measured voltage exceeds the reference voltage or until the measured voltage reaches a preset limit voltage, the preset limit voltage being a voltage that an output voltage of the fuel cell stack is restored to regardless of whether the output current is increased to the preset allowable current or not.

2. The controller according to claim 1, wherein the low efficiency operation is an intermittent operation or a warm-up operation.

3. A fuel cell system capable of switching an operation status between a normal operation and a low efficiency operation having lower power generation efficiency than that of the normal operation, the system comprising:
    a voltage determination part that determines whether a measured voltage of a fuel cell stack of the fuel cell system has exceeded a reference voltage of the fuel cell stack;
    a current control part that increases an output current of the fuel cell stack to a preset allowable current when the measured voltage of the fuel cell stack exceeds the reference voltage of the fuel cell stack, wherein the preset allowable current is determined from an amount of oxidant gas to be supplied to the fuel cell stack and a stoichiometric ratio of air, which is based on the amount of required power generation;
    a voltage update part that updates the reference voltage based on the measured voltage by increasing the reference voltage by a minimum increase amount ΔV from its previous value when the measured voltage does not exceed the reference voltage; and
    a control part that repeats an operation of updating the reference voltage by the voltage update part and decreasing the output current by the current control part until the measured voltage exceeds the reference voltage or reaches a preset limit voltage, the preset limit voltage being a voltage that an output voltage of the fuel cell stack is restored to regardless of whether the output current is increased to the preset allowable current or not.

* * * * *